United States Patent [19]

Clifford

[11] 4,220,620
[45] Sep. 2, 1980

[54] QUENCH BATH

[75] Inventor: Michael L. Clifford, St-Martens-Latem, Belgium

[73] Assignee: Imperial Chemical Industries Limited, London, England

[21] Appl. No.: 897,170

[22] Filed: Apr. 17, 1978

Related U.S. Application Data

[63] Continuation-in-part of Ser. No. 804,376, Jun. 7, 1977, abandoned.

[30] Foreign Application Priority Data

Mar. 21, 1977 [GB] United Kingdom ............... 11807/77

[51] Int. Cl.² .............................................. B29F 3/08
[52] U.S. Cl. ..................... 264/560; 264/562; 264/565; 264/567; 264/237; 264/348; 425/71; 425/404; 425/445
[58] Field of Search ................. 425/71, 404, 445, 446; 264/89, 95, 209, 237, 348, 565–567, 569, 557, 560, 562; 165/47

[56] References Cited

U.S. PATENT DOCUMENTS

| | | | |
|---|---|---|---|
| 3,207,823 | 9/1965 | Glyde et al. | 264/95 |
| 3,337,663 | 8/1967 | Taga | 264/569 |
| 3,600,488 | 8/1971 | Yazawa | 264/95 |
| 3,622,657 | 11/1971 | North et al. | 264/89 |
| 3,685,576 | 8/1972 | North | 165/47 |
| 3,747,672 | 7/1973 | North et al. | 165/47 |
| 3,819,776 | 6/1974 | Robinson et al. | 264/95 |
| 3,904,334 | 9/1975 | Yazawa et al. | 265/95 |
| 3,932,080 | 1/1976 | Uemura et al. | 425/71 |
| 3,950,467 | 4/1976 | Yazawa et al. | 264/178 R |
| 4,093,412 | 6/1978 | Davis et al. | 425/71 |
| 3,532,780 | 10/1970 | Kakutani et al. | 425/71 |

FOREIGN PATENT DOCUMENTS 2231742 1/1974 Fed. Rep. of Germany .
1121041 4/1956 France .
2133564 12/1972 France .

Primary Examiner—Jeffery R. Thurlow
Attorney, Agent, or Firm—Cushman, Darby & Cushman

[57] ABSTRACT

A quench bath for cooling an axially moving tubular form comprises an axially compressible jacket with a liquid-retaining annular seal assembly engageable with the tubular form, inlet and discharge means for cooling liquid, and means to releasably support the jacket in an extended configuration.

The bath is suitable for cooling tubular extrudates in the production of oriented tubular film.

11 Claims, 5 Drawing Figures

QUENCH BATH

This application is a continuation-in-part of Application Ser. No. 804,376 filed on June 7, 1977, and now abandoned.

The invention relates to the production of tubular forms, and, in particular, to equipment for producing a cooled tubular form suitable for conversion to a tubular film.

Oriented tubular film is produced by extruding a relatively thick-walled thermoplastic tube from an annular orifice, and subsequently stretching the extruded tube, at a temperature below the melting temperature and above the glass transition temperature (Tg) of the thermoplastic material, in the transverse and/or longitudinal directions to form a thin film, the stretching being effected in the transverse direction by means of internal gas pressure, and in the longitudinal direction by withdrawing the tube at an appropriate rate in the direction of extrusion. In the case of an oriented film produced from a crystalline or crystallisable polymer, the polymeric extrudate must be rapidly cooled, prior to reheating and stretching, to induce an appropriate crystalline polymeric structure for the production of film of acceptable quality.

Cooling of the extruding tube is conveniently effected internally—for example, by means of a cooling and sizing mandrel located within the tube in the vicinity of the die from which the tube is extruded. If desired, additional external cooling may be effected by passing the tube through an annular cooling bath surrounding the tube in the region of the mandrel. By simultaneously cooling the exterior and interior surfaces of the extruding tube, increased rates of film production may be achieved.

An external cooling bath for use in conjunction with an internal mandrel film-forming system conventionally comprises an annular seal assembly engaging the external surface of the film tube and surmounted by a generally cylindrical jacket into which a liquid coolant, such as water, is supplied. To commence a film production run a polymeric tube is extruded around the mandrel, and is then withdrawn over the mandrel and through the surrounding bath and seal system. At this stage, the thermally softened polymeric tube is liable to stick, or "lock-on", to the mandrel, with consequent damage to the tube and/or mandrel surface, and delay in initiating film production. Therefore, to facilitate access to the mandrel, the jacket usually comprises two semi-cylindrical components which are assembled around the mandrel and secured to each other and to the seal system after the polymeric tube has been threaded therethrough. Assembly, and dismantling, of the jacket is therefore a cumbersome operation which entails a loss of production time and possibly of damage to the tubular extrudate and to the mandrel surface.

We have now developed an improved system for cooling a tubular form.

Accordingly, the present invention provides a quench bath for supplying and maintaining an annular pool of cooling liquid at the external surface of a tubular form moving axially through the bath, said bath comprising an axially compressible, liquid impermeable, jacket for location around the path of such moving tubular form, said jacket being internally dimensioned so as to be spaced apart from the external surface of such tubular form, a seal assembly, cooperating with the jacket and including at least one resilient annular sealing member engageable with the external surface of such tubular form to provide a liquid-retaining chamber within the jacket on the upstream side of said seal assembly, relative to the direction of movement of such tubular form, inlet means operatively associated with said jacket to introduce cooling liquid into the chamber, outlet means operatively associated with said jacket to discharge cooling liquid from the chamber, and means to releasably support the jacket in an axially extended configuration.

Unless otherwise stated, reference throughout this specification to axial movement refers to movement along, or in a direction substantially parallel to, the longitudinal axis of the tubular form.

Although the jacket surrounds the axially moving form, the axial length of the jacket is short in relation to the total axial length of the form and is therefore such that only a "portion" of the form is within the jacket at any particular instant.

The axially compressible jacket is suitably in the form of a hollow, generally cylindrical, tube having an inlet end for receiving a tubular form, and an outlet end provided with an annular seal assembly to permit passage of the form therethrough while retaining between the jacket and tubular form a sufficient volume of cooling liquid to quench the tubular form to a desired temperature.

The jacket may be in any form which permits axial compression of all or part of its length, and suitably comprises a tubular telescopic assembly having a plurality of interengaging, relatively axially slideable tubular sleeve segments. However, the axial compression which can be achieved by an assembly of this kind is inherently restricted by the length of the individual segments of the telescopic assembly. An alternative bath assembly therefore employs a jacket in the form of collapsible bellows so formed from a suitably pleated or folded membrane as to permit compression to a minimal axial dimension. A suitable jacket comprises generally tubular bellows with a circumferentially, symmetrically pleated or corrugated membrane wall structure.

The jacket is fabricated from any material possessing adequate strength, flexibility and liquid impermeability to permit repeated axial compression and extension of the jacket without detriment to the liquid-retaining characteristics thereof. A material or fabric having a knitted, woven, net-like or other form of porous structure which is incapable of retaining cooling liquid in the quenching chamber is therefore unsuitable for fabrication of the jacket. In practice, a light-weight telescopic jacket is suitably fabricated from a corrosion-resistant material, such as thin stainless steel or an aluminium alloy, while a bellows assembly conveniently comprises a membrane of a rubberised fabric. The jacket may, if desired, be provided with reinforcing means—for example, a wire brace girding the jacket membrane in one or more of the reduced cross-sectional regions of the bellows.

To ensure that uniform cooling of the tubular form is achieved, the flow of cooling liquid within the jacket should be substantially uniform around all regions of the form surface, and adjusting means are preferably provided for laterally displacing or centring the jacket relative to the axis of the moving tubular form to a position in which acceptable cooling behaviour is observed, and for retaining the jacket in that selected position.

In addition to being collapsible to minimal axial dimensions to facilitate removal or replacement thereof, a bath according to the invention is also advantageous in that the depth of the bath can be varied during a cooling operation—for example, during production of a tubular film. Thus, simple axial extension of the jacket permits an increased depth of cooling liquid to be accommodated within the bath if an increase in the rate of cooling of the tubular form is desired. An immediate alteration in cooling rate is thereby achieved in a manner not readily possible with the relatively rigid and inextensible cooling baths hitherto employed.

Although a terminal seal assembly at the downstream end of the jacket in the form of a single resilient annular sealing member engageable with the external surface of the tubular form provides an adequate support for the cooling liquid in the bath in certain circumstances, we prefer to employ at least a pair of axially spaced apart annular sealing members to reduce the amount of cooling liquid retained on the external surface of the tubular form emerging from the seal assembly. To ensure that the upstream sealing member, i.e. that which first contacts the tubular form, effectively engages and creates a liquid-retaining seal with the surface of the tubular form, a superatmospheric pressure is desirably maintained on the underside of the upstream sealing member, and if a pair of axially spaced apart sealing members are employed this superatmospheric pressure is conveniently maintained by introducing a pressurised gas, such as air, into the gap between the spaced apart members.

Oriented film produced from a quenched tubular form retaining traces of moisture or cooling liquid on the surface thereof exhibits serious surface blemishes, and desirably therefore a liquid extractor, such as an annular sponge engageable with the external surface of the tubular form is provided downstream of the annular sealing member(s) to remove residual traces of liquid. Assistance of this objective may be achieved by application of suction to the sponge.

Each annular sealing member may comprise a single annular disc of resilient material, such as natural rubber, but to ensure extended life and reliability of the seal assembly, we prefer that at least the upstream sealing member comprises a pair of contiguous annular discs, the upstream disc being of an abrasion resistant resilient material, such as silicone rubber, and the disc in contact with the underside thereof being of a material such as natural rubber. Other materials from which sealing discs may be formed include synthetic polymers, such as polytetrafluoroethylene.

To ensure effective sealing, the internal diameter of each sealing member is suitably fractionally less than the external diameter of the tubular form. Desirably therefore the seal assembly is so positioned that the, or each, sealing member bears against a region of the tubular form provided with an internal support to prevent collapse of the tubular form. Conveniently, the bath sealing members are positioned to cooperate with an internal mandrel located within the tubular form, or with a similar internal sealing assembly located within the tubular form at the downstream end of a lubricated quenching mandrel.

For convenience of operation the sealing members, and, if desired, the liquid extractor, are suitably incorporated in a cartridge or element which can be releasably mounted at the base of the compressible jacket. Thus, a cartridge seal assembly may be located in a simple flanged container and sealed thereto—for example, by one or more O-ring seals around the cartridge periphery, the container being secured, by bolts, clips or the like, to the downstream end of the axially compressible jacket.

A cartridge assembly of the kind referred to is conveniently fabricated from a synthetic polymeric material, an oxymethylene polymer or copolymer being particularly suitable for this purpose. Other materials which may be employed include metals, such as aluminum and stainless steel, and thermosetting resinous materials—such as a Tufnol laminate.

An inlet for the supply of cooling liquid, such as water, is provided at any convenient position on the bath, but preferably at or near the downstream end of the jacket so that the coolant flows through the bath in a countercurrent direction relative to the axial direction of movement of the tubular form.

Although the inlet may introduce coolant to the bath in any direction, including radially inwards, we prefer that the inlet is directed tangentially relative to the tubular form, thereby creating a swirling, spiral, countercurrent flow of coolant around the periphery of the tubular form. The improved heat-transfer between coolant and tubular form achieved by means of the spirally flowing coolant stream increases the cooling efficiency, and therefore decreases the volume of coolant required for a specified degree of cooling, compared to that in which a simple laminar or barely turbulent (Reynolds No. ~2000–3000) countercurrent coolant flow is adopted. By using a spinning, cyclone type coolant flow, particularly in combination with a bath providing a relatively large radial gap (e.g. from 0.2 to 3.0 times the diameter of the tubular form) between the tubular form and surrounding jacket, it is possible to maintain a high velocity, despite the relatively low volume, of coolant flow. Thus, although the axial throughput of coolant in the turbulent zone may be relatively low—for example within a range of from 200 to 1000 gallons per hour (gph), the spiral flow rate of coolant adjacent the surface of the tubular form may, because of recirculation around the form, be considerably greater—for example, of the order of 100,000 gph. Maintenance of a high velocity spiral flow is further assisted by the large gap between the form and jacket which reduces frictional drag on the coolant.

The outlet means for discharging coolant liquid from the chamber between the tubular form and compressible jacket suitably comprises a simple overflow system or discharge conduit at or near the upstream end of the jacket. However, for the production of high quality tubular film free from surface blemishes, it is desirable that the tubular form, before encountering the spiral countercurrent flow of coolant, should first encounter a relatively calm, non-turbulent, pond of coolant liquid. Preferably therefore a throttle assembly to restrict the spiral flow of the coolant liquid, thereby creating a quiescent pool of liquid, is provided at the upstream end of the jacket. Suitably the throttle assembly comprises an annular baffle or breaker plate dimensioned to provide a relatively narrow annular gap between the plate and tubular form. A simple plate of this kind serves to eliminate the spiral flow component of the countercurrent coolant stream, thereby enabling a quiescent pool of liquid to accumulate above the plate, prior to discharge of the liquid over a simple weir or other appropriate device. If desired, additional means may be provided to reduce the spiral component of countercurrent coolant flow—for example, at least one radially directed fin secured to the annular baffle plate.

Coolant liquid may therefore be discharged directly from the upstream end of the compressible jacket and/or from a quiescent pool established upstream of the breaker plate. To ensure the maintenance of a quiescent pool we prefer that a major portion of the coolant flow is discharged from the downstream side of the breaker plate, thereby minimising the coolant momentum transfer across the breaker plate. Provision may also be made to introduce coolant liquid directly into the quiescent zone to vary the cooling characteristics of the bath system.

The form of supporting means to releasably secure the compressible jacket in an axially extended mode depends, inter alia, on the structure of the jacket. A suitable system, particularly for a jacket in the form of tubular bellows, comprises a plurality of axial support members, symmetrically spaced around the jacket, an axially slideable boss or sleeve, attached to the upstream end of the jacket, being associated with each support member and lockable thereto in the desired axial position.

As hereinbefore described, the bath system of the present invention is suitably employed in combination with an internal mandrel quenching system. A typical lubricated mandrel system suitable for the production of polyolefine films is described in British Pat. No. 1,284,321 which relates to the cooling of an extruded tube by passing an extruded tube over an internal cooling mandrel, continuously supplying a film of heat-transfer liquid to between the mandrel and the tube, maintaining, at the end of the mandrel remote from the extruder, a head of liquid capable of exerting pressure on the film of liquid, and withdrawing the liquid from the head, wherein the pressure of the liquid between the mandrel and the tube at any one point is greater than the pressure on the outside of the tube at that point. The film of heat-transfer liquid is coveniently supplied by overflow from a circumferential channel at the upstream end of the mandrel, i.e. adjacent the extrusion die.

The system of the present invention may be employed to cool tubes derived from any extrudable materials, and is preferably employed in relation to the production of tubular films from thermoplastics polymeric materials, and particularly in the production of tubes and self-supporting films of crystalline or crystallisable polymers. For example, polymers and copolymers of a 1-olefine containing from 2 to 6 carbon atoms in its molecule, such as high density polyethylene, polypropylene or ethylene propylene copolymers, of polybutene-1, of poly-4-methyl pentene-1, of polyesters such as polyethylene terephthalate and polyethylene-1,2-diphenoxyethane-4,4'-dicarboxylate, of polysulphones, and of the various nylons, may be processed. A suitable filmforming material is a high molecular weight stereoregular predominantly crystalline polymer of proplyene, either in the form of a homopolymer or copolymerised with minor quantities (e.g. up to 15% by weight of the copolymer) of other unsaturated monomers, such as ethylene. Coated films and coextruded multiple-layer film may also be processed.

By a "self-supporting" film is meant a film capable of independent existence in the absence of a supporting substrate.

An oriented tubular film is suitably produced by melt extruding the desired polymeric material in tubular form from a simple annular die, cooling the extruded tube in accordance with the present invention, reheating and inflating the tube by the so-called "bubble" process to introduce transverse orientation, and simultaneously elongating the tube longitudinally to orient the film in a lengthwise direction. The film is then preferably "heat-set", i.e. dimensional stability of the film is improved by heating the film, while restrained against thermal shrinkage, to a temperature above the glass transition temperature of the polymer from which the film is formed but below the melting point thereof.

A similar technique employing a multi-channel, annular, coextrusion die is suitable for the production of multiple-layer films, such as a polypropylene substrate having on at least one surface thereof a layer of a copolymer of propylene (80 to 95% by weight) with another alpha-olefine containing from 4 to 10 carbon atoms, such as butene-1.

Films made from tubes cooled according to the present invention may conveniently contain any of the additives conventionally employed in the manufacture of thermoplastics films, may be subjected to conventional after-treatments—for example, exposure to a corona discharge treatment to improve the bonding and print-receptive characteristics of the film surface, and may vary in thickness depending on the intended application. Films having a thickness of from 2 to 150 microns are of general utility, while those intended for use in packaging operations are suitably within a thickness range from 10 to 50 microns.

The invention is illustrated by reference to the accompanying drawings in which.

Figure 1:
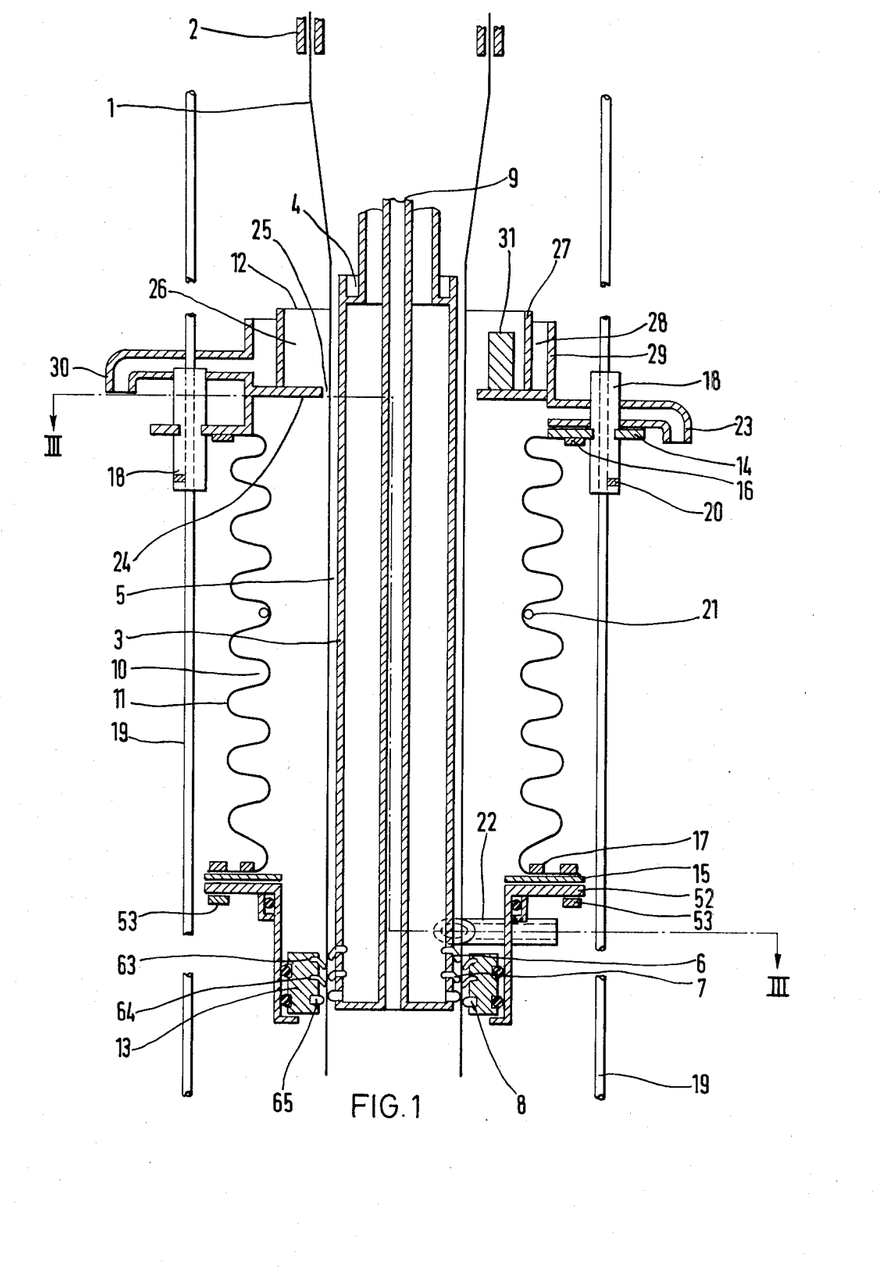
FIG. 1 is a schematic sectional elevation of an axially compressible bellows quench bath in an extended configuration for cooling a tubular extrudate.

Referring to FIG. 1 of the drawings, a tube of thermoplastics polymeric material 1 is extruded from an annular extrusion die 2, and withdrawn therefrom in a substantially vertical downward direction, on to a slightly tapered internal cooling mandrel 3 by a pair of contra-rotating nip rolls (not shown), which then forward the cooled tube for further treatment. An aqueous coolant is supplied to an annular channel 4 at the upstream end of the mandrel whence it is allowed to flow down as an annular sheath in the space 5 between the mandrel 3 and the tube 1. Coolant accumulating above a resilient annular sealing member 6, is removed in a controlled manner through the interior of the mandrel by conventional withdrawal means (not shown).

An effective seal between the tube 1 and mandrel 3 is provided by a second resilient annular sealing member 7, and final traces of coolant are removed from the internal surface of the tube by contact with an annular sponge 8. Coolant absorbed by the sponge is removed therefrom by the application of suction from a pipe (not shown) passing through the interior of the mandrel.

An internal conduit 9 through the centre of the mandrel is provided for the introduction of gas, e.g. air, under pressure to inflate the cooled and reheated tube in conventional manner for the production of oriented tubular film.

As well as being cooled internally by the mandrel, the tube 1 is cooled externally by passage through a water bath, designated generally by reference 10, which surrounds the tube. The bath comprises an axially compressible jacekt in the form of symmetrically pleated bellows 11 of a resilient and waterproof material, such as a rubberised fabric. The upstream end of the bath is open to provide an inlet orifice 12 through which the tube may be introduced, and a cartridge sealing assembly 13 at the downstream end of the bath provides a liquid-tight exit orifice through which the cooled tube may pass for further treatment—including conversion to tubular film.

Each end of the bellows is secured respectively to an annular flange plate, 14, 15, by a ring of studs or rivets 16, 17, the upstream flange plate 14 being supportable in the axially extended configuration of FIG. 1 by four bosses 18 respectively axially slideable on each of four symmetrically disposed runners 19, and releasably securable thereto by grub screws 20.

To prevent excessive outward distortion of the bellows under the pressure of liquid (water) within the bath in the extended mode, a circular wire brace 21 is incorporated in at least one of the reduced cross-sectional regions, or circumferential pleats, of the bellows.

Figure 3:
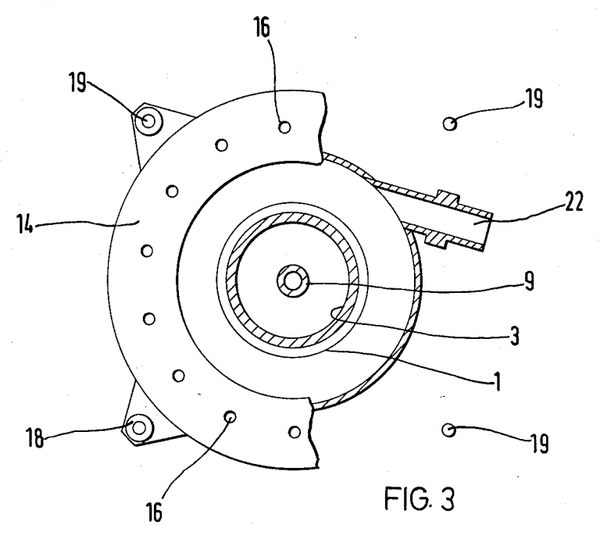
FIG. 3 is a schematic sectional plan view along the line III—III of FIG. 1.

An inlet conduit 22 for cooling liquid is located near the downstream end of the bath, the inlet being disposed tangentially relative to the jacket assembly (FIG. 3), thereby ensuring that the cooling liquid flows upwardly in a spiral countercurrent flow relative to the axial direction of movement of tube 1, an outlet conduit 23, closeable by a valve (not shown), being provided near the upstream end of the jacket to control discharge of cooling liquid from the bath, if desired.

An annular breaker plate 24 positioned upstream of discharge outlet 23, provides a restricted throttle gap 25 through which cooling liquid flows in an upstream direction relative to tube 1, the breaker plate substantially eliminating the spiral component of liquid flow to create a relatively calm pond of liquid within a chamber 26 bounded by tube 1, plate 24 and upstanding annular wall 27. Cooling liquid from the calm pond overflows the top of wall 27 into a discharge chamber 28 bounded by a further annular wall 29, and is discharged in controlled fashion from a second discharge conduit 30.

At least one radially disposed fin plate 31 upstanding from breaker plate 24 assists the maintenance of a calm pool of cooling liquid in chamber 26.

Figure 2:
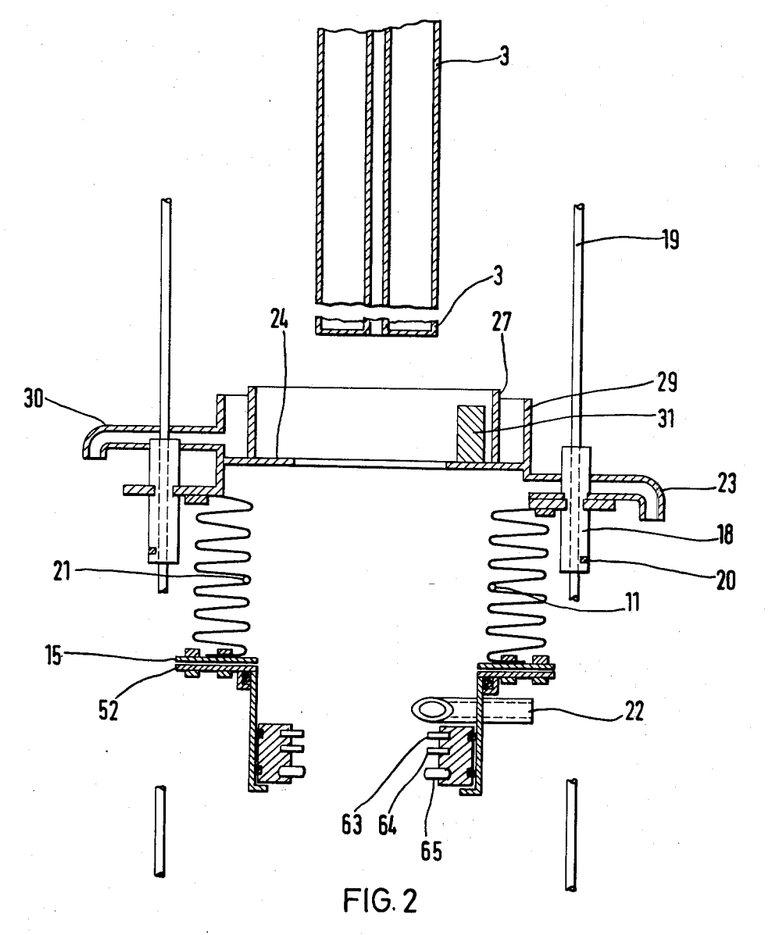
FIG. 2 is a similar view of the bath in an axially compressed configuration.

Alteration of the depth of cooling liquid in contact with the tubular extrudate requires only a simple axial adjustment of the slideable bosses 18 on runners 19, and removal of the bath from around the mandrel is readily accomplished by compression of the bellows assembly to the position illustrated in FIG. 2, after discharge of the cooling liquid from the bath, the bath assembly together with its supporting runners 19 being mounted on a pivotal support bracket (not shown) for displacement relative to the mandrel axis.

Figure 4:
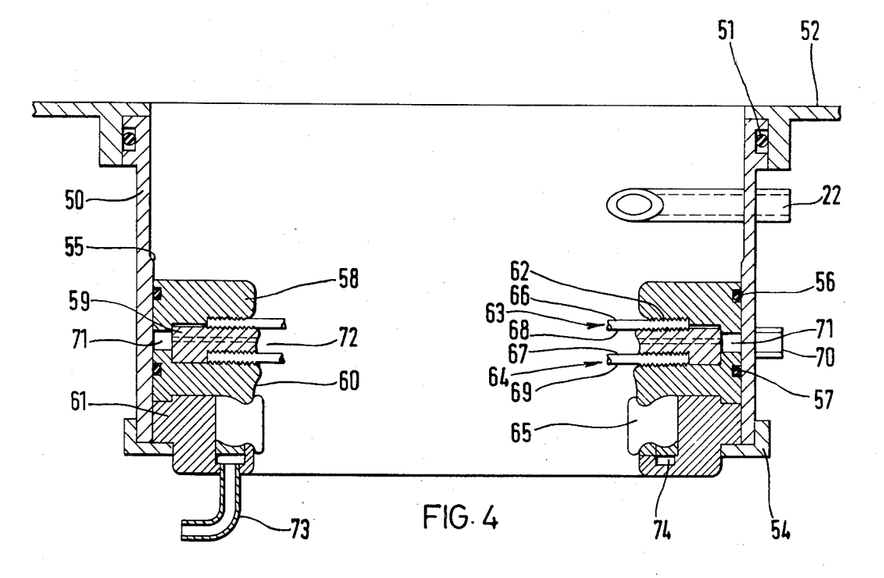
FIG. 4 is a detailed schematic sectional elevation, to a different scale, of a cartridge seal assembly.

The cartridge sealing assembly at the downstream end of the compressible jacket is conveniently described by reference to FIG. 4 and comprises a cylindrical case 50 coupled through a resilient O-ring seal 51 to an annular flange plate 52 which can be secured to bellows flange plate 15 by a ring of bolts 53 (FIG. 1). An angled flange 54 at the downstream end of case 50 retains a cartridge element 13 which can be introduced into the upstream end of case 50 and urged downwardly beyond land 55 to be retained in sealing engagement with the internal wall of the case by means of resilient O-ring seals 56, 57.

The cartridge element comprises a plurality of annular interlocking components 58, 59, 60, 61, securable to each other by axially penetrating bolts, studs, or the like, (not shown) to form a composite element providing annular recesses with cooperating toothed surfaces, e.g. surface 62, between which are retained annular sealing members 63, 64, and annular sponge 65. Each sealing member comprises an annular silicone rubber disc 66, 67, for engagement with the external surface of the tube (FIG. 1), supported on the underside by a natural rubber disc 68, 69. Inlet conduit 70 to annular channel 71 permits the introduction of gas under pressure to the space 72 between sealing members 63 and 64 to create a zone of superatmospheric pressure to support the upstream sealing member 63 in close sealing engagement with the tube surface (FIG. 1).

Exhaust conduit 73 coupled through annular channel 74 to sponge 65 permits the application of suction to remove moisture accumulated by sponge 65 from the external surface of tube 1.

Figure 5:
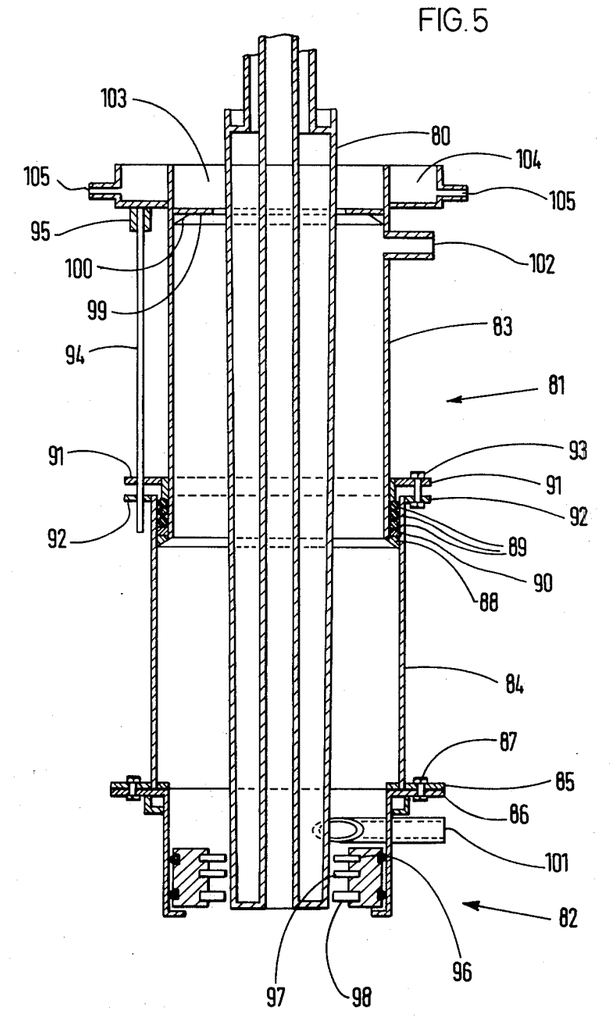
FIG. 5 is a schematic sectional elevation of a mandrel assembly and axially compressible telescopic quench bath in an extended configuration.

Referring to FIG. 5, a mandrel assembly 80 (represented only in simplified outline form) is located within a telescopic quench bath, generally designated 81, in an operative, axially extended configuration. The bath assembly comprises a cartridge sealing assembly, of the kind hereinbefore described, and generally designated 82, surmounted by two interengaging, relatively axially slideable tube segments 83 and 84 of a lightweight, corrosion-resistant material, such as an aluminium alloy.

Tubular segment 84 is mounted on an annular flange plate 85 which is secured to a mating flange 86 on the cartridge assembly by a ring of studs or rivets 87.

Tubular segment 83 is slideably positioned within segment 84 by means of a locating ring 88, suitably fabricated from polytetrafluoroethylene, secured to the downstream end of segment 83 for sliding engagement with the internal surface of segment 84, by means of screws, or the like (not shown).

Liquid-tight engagement between the two segments is achieved by means of at least one, conveniently three, resilient sealing rings 89, suitably of silicone rubber, located upon an annular rim or lip 90 on the inner surface of segment 84. By drawing annular flange 91, secured to segment 83, towards flange 92, on segment 84, by means of a plurality (suitably three) of uniformly spaced apart adjuster bolts 93 (only one of which is shown) the sealing rings undergo axial compression and radial expansion to seal the gap between the two segments. Slackening of bolts 93 releases the compressive force on the sealing rings thereby permitting segment 83 to slide within segment 84, to a selected position, on regularly spaced guide bars 94 (only one of which is shown) secured to the upstream end of segment 83 by a boss 95 and freely slideable in an aperture in each of flanges 91 and 92.

To operate the system, a tube of polymeric material is extruded downwardly around mandrel 80 and manipulated through the bath in the axially compressed configuration, i.e. with segment 83 fully retracted within segment 84. When the tube has established a sealing relationship with sealing members 96, 97 and sponge 98 of the cartridge sealing assembly, an annular breaker or throttle plate 99, in the form of two semi-annular segments, is inserted around the tube to rest on annular lip 100 near the upstream end of segment 83. Cooling water is then introduced through tangential inlet conduit 101, the bath is axially extended to the operative position shown in FIG. 5, and the cooling water allowed to flow in an upstream spiral turbulent flow around the tube, a major portion of the cooling water being discharged in controlled fashion through exit conduit 102. Surplus cooling water passes upstream of breaker plate 99 to establish a quiescent pond 103, and thence overflows into discharge chamber 104 from which the water is discharged through conduits 105.

Alteration of the depth of cooling liquid in contact with the tubular extrudate is readily achieved by simple sliding adjustment of the relative axial positions of segments 83 and 84.

If desired, one or more radially disposed fins or baffles (not shown) may be disposed within the bath to control the turbulence of flow of the cooling water.

Although the bath of FIG. 5 includes two relatively slideable tubular jacket segments, it will be appreciated that a greater number of segments may be employed if desired, thereby enabling the axial dimension of the fully collapsed bath assembly to be reduced in relation to the axial dimension of the individual segments.

The invention is further illustrated by reference to the following Examples.

EXAMPLE 1

Using a mandrel system and a bellows-type bath assembly of the kind illustrated in FIGS. 1 to 4 of the drawings, a propylene homopolymer, at a temperature of about 230° C., was extruded at a rate of 420 lbs/hour (190.5 kg/hour) through an annular extrusion die 2 having a diameter of 6.5 inches (165 mm) and a die gap of 0.060 inch (1.52 mm). The upstream end of the mandrel 3 was 1 inch (25.4 mm) below the extrusion die, and the mandrel, which had a matt surface, was tapered over its length of 48 inches (1219 mm) from 6.25 inches (158.7 mm) at its upstream end to 6.125 inches (155.6 mm) at its downstream end.

Cooling water, at a temperature of about 12° C., was supplied at a rate of 36 gallons/hour (163.6 liters/hour) to channel 4 from which it overflowed to form an annular sheath in space 5 between the mandrel and tubular extrudate. Water from this sheath accumulated above sealing member 6 and was removed through the core of the mandrel by suitable means (not shown). Cooling water was also circulated through the interior of the mandrel.

With the bellows in the axially extended position of FIG. 1, cooling water, at a temperature of about 17° C., was introduced through tangential inlet conduit 22 at a rate of 300 gallons/hour (1364 liters/hour) to create a turbulent stream spiralling upwardly around the tube towards breaker plate 24, cooling water being discharged from outlet 23 at a rate of about 280 gallons/hour (1273 liters/hour). Surplus cooling water passed upwardly through throttle gap 25 to form a quiescent pond within chamber 26, and was discharged from conduit 30.

The quenched tube emerging from the base of the cooling bath had a surface temperature of about 20° C., and was suitable for conversion to biaxially oriented tubular film by reheating, inflating and longitudinally stretching, as described in our British Pat. No. 1 284 321.

EXAMPLE 2

Using a mandrel system of the kind described in Example 1, but replacing the bellows-type bath with a telescopic bath assembly of the kind shown in FIG. 5 of the drawings, a propylene homopolymer, at a temperature of about 240° C., was extruded in the form of a tube onto the mandrel at a rate of 730 lbs/hour (330 kg/hour).

The mandrel itself was internally cooled by circulation of cold water through the interior thereof, and cooling water at a temperature of about 12° C. was supplied to form a sheath between the mandrel and extruded tube at a rate of about 40 gallons/hour (182 liters/hour).

With the telescopic bath in the axially extended position of FIG. 5, cooling water, at a temperature of about 17° C., was introduced through tangential inlet conduit 101 at a rate of 300 gallons/hour (1364 liters/hour) to create a turbulent stream spiralling upwardly around the tube towards breaker plate 99, cooling water being discharged from outlet 102 at a rate of about 280 gallons/hour (1273 liters/hour). Surplus cooling water passed upwardly to form a quiescent pond 103 and overflowed into chamber 104 to be discharged from conduit 105.

The quenched tube emerging from the base of the cooling bath had a surface temperature of about 70° C., and was suitable for conversion to biaxially oriented tubular film by reheating, inflating and longitudinally stretching, as described in our British Pat. No. 1 284 321.

EXAMPLE 3

This is a comparative Example, not according to the invention.

Using a mandrel system of the kind described in Example 1, but replacing the bellows-type bath with a non-collapsible bath of the kind described in our British Pat. No. 1 284 321, a propylene homopolymer, at a temperature of about 240° C., was extruded in tubular form onto the mandrel at a rate of 730 lbs/hour (330 kg/hour).

Temperatures and flow rates of cooling water to the mandrel and bath were identical to the values quoted in Example 2, save that the total flow of cooling water to the bath (1364 liters/hour) was allowed to overflow into a discharge chamber at the upstream end of the bath.

The surface temperature of the cast tube emerging from the base of the cooling bath was 75° C., i.e. cooling was less effective than with the spiral flow, collapsible bath system operated under the comparable conditions of Example 2.

I claim:

1. A quench bath for supplying and maintaining an annular pool of cooling liquid at the external surface of a tubular form moving axially through the bath, said bath comprising
    an axially compressible, liquid impermeable, tubular jacket having an axially facing inlet orifice to receive the form and an axially facing exit orifice to eject the cooled form, a seal assembly, co-operating with the exit orifice of the jacket and including at least one radially inwardly extending resilient annular sealing member for engagement with the external surface of the tubular form, said seal assembly and jacket together providing a liquid-retaining chamber within the jacket on the upstream side of said seal assembly, inlet means operatively associated with said jacket to introduce cooling liquid into the chamber, outlet means operatively associated with said jacket to discharge cooling liquid from the chamber, and support means located exteriorly of the jacket and cooperating therewith to releasably support the jacket in an axially extended configuration.

2. A bath according to claim 1 wherein the jacket comprises a plurality of interengaging, relatively axially slideable tubular sleeve segments.

3. A bath according to claim 1 wherein the jacket comprises tubular bellows having a circumferentially pleated wall.

4. A bath according to claim 1 wherein the seal assembly is releasably mounted in the exit orifice of the jacket.

5. A bath according to claim 1 wherein the liquid inlet means comprises a conduit at the downstream end of the jacket, said conduit being disposed tangentially relative to the jacket.

6. A bath according to claim 1 comprising an annular throttle between said inlet and outlet means to restrict the flow of cooling liquid through said chamber.

7. A bath according to claim 6 wherein said throttle comprises at least one axially extending fin directed radially inwardly toward the longitudinal axis of the bath.

8. A bath according to claim 6 including means to discharge liquid downstream of said throttle.

9. A bath according to claim 1 wherein said support means comprises a plurality of axially extending support members circumferentially spaced around the jacket, and a plurality of axially slideable bosses, each of said bosses being associated with, and lockable to, a support member, and being attached to the upstream end of the jacket.

10. A bath according to claim 1 including an axially disposed mandrel within the jacket.

11. A method of forming an oriented polymeric tubular film comprising extruding a molten film-forming polymeric material in tubular form, passing the extruded form over an internal mandrel to cool the internal surface of the form, simultaneously passing the extruded form through a quench bath to cool the external surface of the form, reheating the cooled form, and inflating and simultaneously longitudinally stretching the reheated form, said bath comprising an axially compressible, liquid impermeable, tubular jacket having an axially facing inlet orifice to receive the form and an axially facing exit orifice to eject the cooled form, a seal assembly, co-operating with the exit orifice of the jacket and including at least one radially inwardly extending resilient annular sealing member for engagement with the external surface of the tubular form, said seal assembly and jacket together providing a liquid-retaining chamber within the jacket on the upstream side of said seal assembly, inlet means operatively associated with said jacket to introduce cooling liquid into the chamber, outlet means operatively associated with said jacket to discharge cooling liquid from the chamber, and support means located exteriorly of the jacket and cooperating therewith to releasably support the jacket in an axially extended configuration.

* * * * *